United States Patent [19]
Corompt

[11] 3,878,948
[45] Apr. 22, 1975

[54] SELF-CONTAINED DEVICE FOR HANDLING CONTAINERS ON A LORRY

[75] Inventor: Antoine Corompt, Saint-Etienne, France

[73] Assignee: Bennes Marrel, Saint-Etienne (Loire), France

[22] Filed: May 23, 1973

[21] Appl. No.: 362,984

[52] U.S. Cl. .............................. 214/77 R; 214/515
[51] Int. Cl. .............................................. B60p 1/48
[58] Field of Search .............. 214/77 R, 78, 80, 515

[56] References Cited
UNITED STATES PATENTS

| | | | |
|---|---|---|---|
| 2,639,825 | 5/1953 | Eakin | 214/77 R |
| 3,239,080 | 3/1966 | Corompt | 214/77 R |
| 3,610,690 | 10/1971 | Mengel | 298/17.5 |

FOREIGN PATENTS OR APPLICATIONS

| | | | |
|---|---|---|---|
| 327,169 | 8/1970 | Sweden | 214/77 R |

Primary Examiner—Robert G. Sheridan
Assistant Examiner—Leslie J. Paperner
Attorney, Agent, or Firm—Sughrue, Rothwell, Mion, Zinn & Macpeak

[57] ABSTRACT

A container handling device is mounted on the rear load supporting frame of a lorry and is comprised of a hoisting gantry pivotally mounted on a sub-frame which in turn is pivotally mounted on the rear end of the frame. The gantry is first pivoted to a raised position on the sub-frame by a rearwardly acting hydraulic jack and upon engaging a stop on the sub-frame the gantry and sub-frame will pivot as a unit on the frame to further raise the gantry.

4 Claims, 5 Drawing Figures

SELF-CONTAINED DEVICE FOR HANDLING CONTAINERS ON A LORRY

The present invention relates to a device mounted on a vehicle such as a lorry or truck, and intended to pick up boxes or the like containers from the ground to lay them on the lorry, or lay same on the ground from the lorry.

Devices of this kind are known, which are controlled by a single gear such as, for instance, a system including two jacks linked to the frame of the vehicle, on the one hand, and to the arms of a loading gantry mounted on the vehicle, on the other hand.

Said known devices have drawbacks, in that the jacks must be able to extend over a considerable length, while they bear substantially the whole weight of the container during the loading or unloading operation. Consequently, they are expensive, since they must be very strong and highly leak-proof. Should the gantry encounter an obstacle, the jacks will be subjected to undue stresses, whereby they are in danger of becoming buckled.

The object of the present invention is to obviate such drawbacks by providing a device owing to which the jacks will be less liable to buckle, while being less expensive than in the known devices.

A device according to the invention, intended to be fitted onto the carrying frame of a lorry, includes a cranked hoisting gantry adapted to rock under the action of at least one jack which is linked to the frame of the lorry, on the one hand, and to said gantry, on the other hand, and is characterized in that the lower arms of the gantry are linked to the front of a sub-frame, the rear part of which is linked in turn to the rear of the frame of the lorry, while stops are provided between said sub-frame and the lower arms of the gantry to limit the angle of raising of the latter with respect to the sub-frame.

According to another feature, in the position of transport of the device, the sub-frame and the lower arms of the gantry are lying in prolongation of each other, substantially horizontally, on the frame of the lorry, while the jacks are retracted and the upper arms of the gantry stand up substantially vertically at the front of the loading platform of the lorry.

According to another feature, the raising of the device through the extension of the jacks is carried out in two successive steps, to wit:

a. raising of the gantry, which pivots with respect to the sub-frame, the latter remaining unmoved in its horizontal position on the frame;

b. raising of the assembly constituted by the gantry and the sub-frame, which assembly becomes rigid after the position is reached wherein the gantry and the sub-frame are abutting against each other.

According to another feature, the free ends of the upper arms of the gantry include handling means adapted to be fixed to a load, in particular, to a container.

According to another feature, the device according to the invention is used for loading or unloading a container which rests in its loading position on the frame of the lorry, the jacks, the sub-frame and the lower arms of the gantry lying in that case under said container, while the upper arms of said gantry stand up in front of the container.

According to another feature, the raising of the gantry through a rocking motion allows hooking a container lying on the ground and lifting it till it is loaded on the platform of the lorry.

According to another feature, during at least a part of the raising motion of the gantry, the points at which the jacks are linked to said gantry are lying above the theoretical lines connecting the free ends of the upper arms of the gantry to the points at which the lower arms of the gantry are linked to the sub-frame.

According to another feature, when the device starts being raised from its inoperative position, wherein the jacks are retracted and lie substantially horizontally, the lever arm presented to the action of said jacks is higher by at least 20 percent than the value observed on the devices of the prior art, so that it is possible to reduce the pressure stresses of the jacks, in particular upon starting.

The appended drawing, given by way of non-limiting example, will enable the features of the invention to be more clearly understood.

Figure 1:
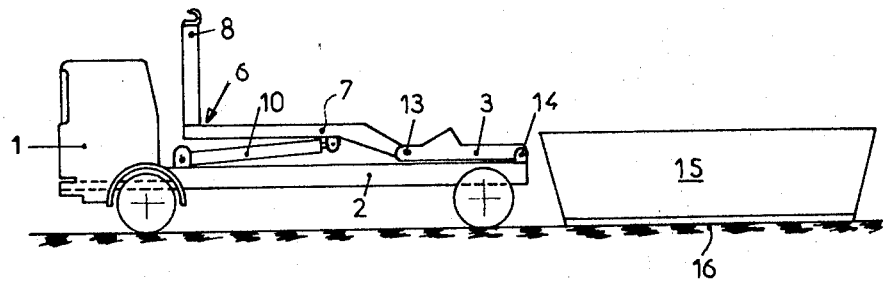
FIGS. 1 to 4 are diagrammatical side views, illustrating a lorry fitted with a device according to the invention, and showing the sequence of motions of said device for picking up a container lying on the ground.

FIG. 1 shows a lorry 1 having a fixed frame 2. The rear end of a sub-frame 3 is linked to the rear end of the frame 2 through a transverse pin 14, while the front end of said sub-frame is linked through a pin 13 to a cranked gantry 6, which is adapted to rock under the action of two hydraulic jacks 10, the movable stems of which are linked to said gantry by pins 12, and the bodies of which are linked to the frame 2 by pins 11. FIG. 1 shows the assembly in its operative or transport position on the lorry, while a container 15 lying on the ground 16 is ready to be picked up.

Figure 2:
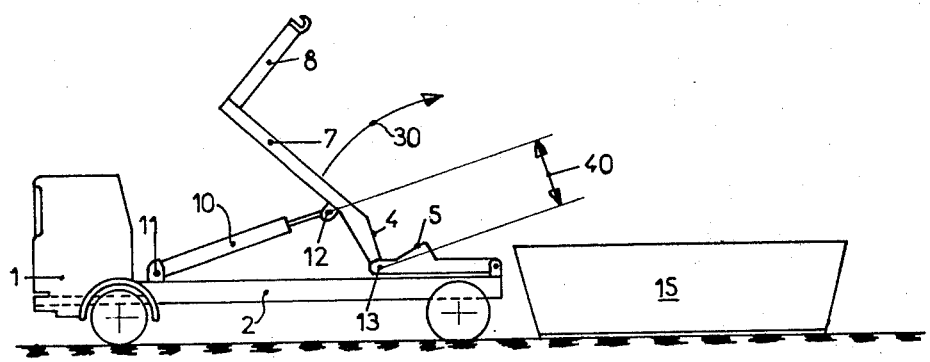

At the beginning of the actuation of the jacks 10, the sub-frame 3 remains unmoved with respect to the frame 2, while the gantry 6 rises (FIG. 2) by pivoting about the pin 13 mounted on the subframe 3, under the action of the pressure exerted by the jacks on the lower arms 7 of the gantry at the point 12. During said step, the front surface 4 of the gantry and the upper surface of a stop 5 provided on the sub-frame 3 begin coming nearer to each other.

Figure 3:
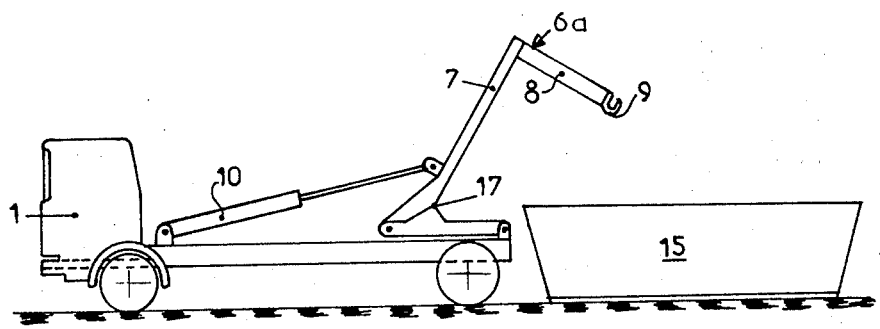

FIG. 3 shows a first position of equilibrium of the device. The surface 4 has come to abut against the upper surface of the stop 5 to define therewith a toggle joint, whereby the sub-frame 3 and the gantry 6 are made integral with each other during the continuation of the rocking motion in the direction of the container 15.

Figure 4:
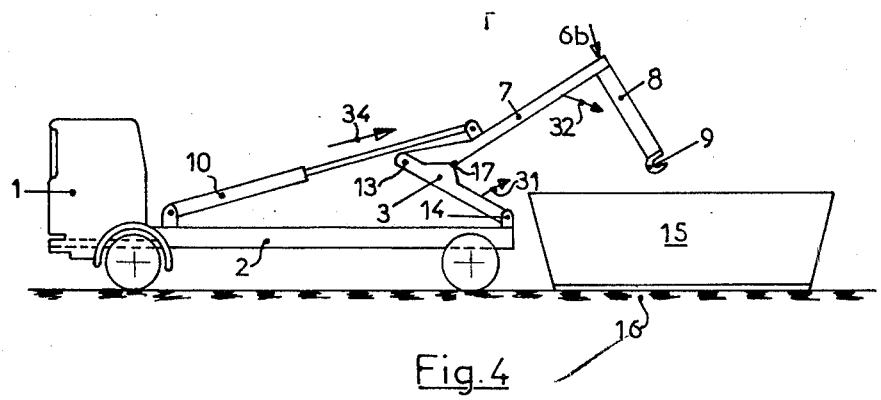

As the jacks 10 keep extending beyond the position shown in FIG. 3, the sub-frame 3 pivots together with the gantry 6 about the pin 14, in the direction of the arrow 31 (FIG. 4), till the upper arms 8 of the gantry, which are normal to the lower arms 7, are in a position wherein the lifting means, such as hooks 9, they carry are able to hook the container 15.

Figure 5:
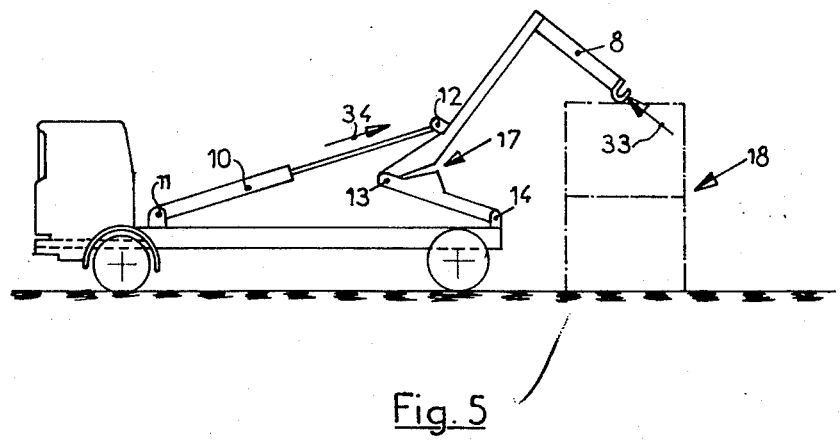
FIG. 5 is a similar view, showing how the device according to the invention prevents the jacks from buckling when the upper arms of the gantry encounter an obstacle.

FIG. 5 shows the upper arms 8 of the gantry running, in use, against an obstacle 18, in which case the toggle joint 17 is able to open against the pressure in the jacks 10, owing to the joints 13, 14, 12, 11, without any bypass being required on the jacks 10.

The operation of the device according to the invention is described hereinafter, starting from the transport position as shown in FIG. 1, and is as follows: with the jacks 10 fully retracted, the sub-frame 3 rests on the frame 2 of the lorry, while the lower arms 7 are substantially horizontal, so that the upper arms 8 are substantially vertical (FIG. 1). As the extension of the jacks 10 begins, the gantry 6 pivots about the linking pin 13 in the direction of the arrow 30. As soon as the raising operation has begun, a lever arm is obtained, as indicated by the arrow 40 in FIG. 2, and the efforts of the jacks 10 are comparatively low. When the front surface 4 of the gantry and the upper surface 5 of the stop 5 come to bear against each other in the position 6a of FIG. 3, the further extension of the jacks 10 causes the gantry-sub-frame assembly to pivot about the pin 14 in the directions of the arrows 31, 32 till the position 6b (FIG. 4) is reached, in which position the hooks 9 make it possible to hook and lift the container 15.

To load the container onto the vehicle 1, it is then only necessary to repeat the same operations in the reverse order.

In the event of the upper arms 8 of the gantry encountering an obstacle 18 during their movement towards the container 15 (FIG. 5), and being subjected to a stress in the direction of the arrow 33, which stress would oppose to the hydraulic pressure from the jacks 10 in the direction of the arrow 34, the toggle joint 17 would open owing to the joints 13, 14, 12, and 11, and relieve the jacks 10, whereby the latter would not be liable to buckle.

The advantages of the device according to the invention are as follows:

it does not require very strong and, therefore, expensive jacks, since the stresses to which the jacks are subjected are fairly low, owing to the joint 13 which produces very quickly a substantial lever arm, on the one hand, and to the distribution of the stresses among the joints 11, 12, 13, and 14, on the other hand;

the toggle joint defined by the front surface of the gantry bearing on the upper surface of the stop 5 on the sub-frame 3 provides a safety device in the event of a wrong handling;

said stop on the sub-frame limits the angle of rotation of the gantry about the sub-frame, without limiting the rocking of the rigid assembly defined by the gantry and the sub-frame abutting against each other.

I claim:

1. A container handling device adapted to be mounted on a lorry frame comprising a sub-frame having front and rear ends, first pivot means for pivotally connecting the rear end of said sub-frame on the rear end of said lorry frame, for pivotal movement of said sub-frame between a transport position parallel to said lorry frame and a loading and unloading position raised from said lorry frame, hoisting gantry means including lower arms having upper and lower ends and upper arms disposed substantially perpendicular to and secured to said upper ends of said lower arms, second pivot means pivotally interconnecting said lower ends of said lower arms and the front end of said sub-frame for pivotal movement of said lower arms between a transport position parallel to said lorry frame and a loading and unloading position raised from said lorry frame, stop means disposed adjacent said second pivot means to limit the pivotal movement of said lower arms relative to said sub-frame, jack means adapted to be pivotally mounted at one end on said lorry frame adjacent said upper ends of said lower arms when said lower arms are disposed in said transport position and third pivot means pivotally interconnecting the other end of said jack means and said lower arms intermediate the ends thereof.

2. A container handling device as set forth in claim 1 further comprising handling means connected to the free ends of said upper arms for connecting to a container.

3. A container handling device as set forth in claim 1 wherein said lower arms are cranked at a point intermediate the ends of said arm, said third pivot means being disposed at said point to obtain a lever arm between said second and third pivot means during the initial pivoting of said lower arms about said second pivot means by said jack means.

4. A container handling device as set forth in claim 3 wherein subsequent to the engagement of said stop means by said lower arms during the raising thereof, said lower arms will reach a position wherein the said points at which said jack means are connected to said lower arms lie above the theoretical lines connecting the free ends of said upper arms and said second pivot means.

* * * * *

UNITED STATES PATENT AND TRADEMARK OFFICE
CERTIFICATE OF CORRECTION

PATENT NO. : 3,878,948
DATED : April 22, 1975
INVENTOR(S) : Antoine COROMPT

It is certified that error appears in the above-identified patent and that said Letters Patent are hereby corrected as shown below:

IN THE HEADING:

Under Foreign Priority Data insert -- France   72 19 596   May 23, 1972 --

Signed and Sealed this

Third Day of August 1976

[SEAL]

Attest:

RUTH C. MASON
Attesting Officer

C. MARSHALL DANN
Commissioner of Patents and Trademarks